United States Patent [19]

McGee et al.

[11] Patent Number: 5,563,184
[45] Date of Patent: Oct. 8, 1996

[54] MACROMONOMERS

[75] Inventors: Joseph A. McGee, Dewitt; Paul L. Valint, Jr., Pittsford, both of N.Y.

[73] Assignee: Bausch & Lomb Incorporated, Rochester, N.Y.

[21] Appl. No.: 333,441

[22] Filed: Nov. 2, 1994

Related U.S. Application Data

[62] Division of Ser. No. 186,204, Jan. 25, 1994, Pat. No. 5,387,663, which is a division of Ser. No. 998,346, Dec. 30, 1992, Pat. No. 5,336,797.

[51] Int. Cl.$^6$ .......................... G02C 7/04; C08F 230/08; C08F 228/02
[52] U.S. Cl. .......................... 523/107; 526/279; 526/286; 351/160 H; 528/26; 528/29; 528/32
[58] Field of Search .......................... 523/107; 526/279, 526/286; 528/26, 29, 32; 351/160 H

[56] References Cited

U.S. PATENT DOCUMENTS

| | | | |
|---|---|---|---|
| 3,808,178 | 4/1974 | Gaylord | 260/86.1 |
| 4,120,570 | 10/1978 | Gaylord | 351/40 |
| 4,780,515 | 10/1988 | Deichert | 526/245 |
| 4,952,711 | 8/1990 | Jacobine | 522/99 |
| 5,057,578 | 10/1991 | Spinelli | 525/278 |
| 5,079,319 | 1/1992 | Mueller | 526/238.23 |
| 5,177,165 | 1/1993 | Valint | 526/245 |

FOREIGN PATENT DOCUMENTS

| | | |
|---|---|---|
| 0362145 | 4/1990 | European Pat. Off. . |
| 93/12624 | 12/1993 | WIPO . |

OTHER PUBLICATIONS

Syntheses of Methyl Methacrylate–Stearyl Methacrylate Graft Copolymers and Characterization by Inverse Gas Chromatography, Mar. 1980.

*Primary Examiner*—Paul R. Michl
*Assistant Examiner*—Andrew E. C. Merriam
*Attorney, Agent, or Firm*—John E. Thomas; Denis A. Polyn

[57] ABSTRACT

Novel siloxane macromonomers are disclosed which can be copolymerized with hydrophilic monomers or hydrophobic monomers to prepare polymeric materials useful as biomedical devices. The copolymers made from hydrophilic monomers exhibit good oxygen permeability and are particularly suitable for use in contact lenses.

13 Claims, No Drawings

MACROMONOMERS

This is a divisional of application Ser. No. 08/186,204 filed on Jan. 25, 1994, now U.S. Pat. No. 5,387,663 which is in turn a divisional of Ser. No. 07/998,346 filed on Dec. 30, 1992 and is now U.S. Pat. No. 5,336,797 which issued on Aug. 9, 1994.

BACKGROUND OF THE INVENTION

1. Field of the Invention

The present invention relates to novel macromonomers useful in the preparation of biomedical devices. More particularly, this invention relates to siloxane macromonomers which can be copolymerized with hydrophilic or hydrophobic monomers to prepare biomedical devices such as contact lenses. This invention includes the macromonomers, intermediate polymers used to prepare the macromonomers and the copolymers prepared from the macromonomers.

2. Background of the Invention

Various monomers useful in the preparation of biomedical devices are known. For example, contact lenses, one type of biomedical device, consist of polymers and copolymers having various types and concentrations of monomers. Rigid gas-permeable (RGP) contact lenses generally include silicone-containing monomers which are generally hydrophobic in nature. Soft contact lenses or "hydrogel" lenses are generally made from hydrophilic monomers such as polyhydroxyethyl methacrylate.

Until recent years, RGP contact lenses and hydrogel contact lenses had distinct properties. Hydrogel contact lenses, particularly those with high water content, tended to be weak, subject to deposit formation, and exhibit lower visual acuity than RGP lenses. RGP contact lenses tended to be less comfortable, had low water content, and generally exhibit higher visual activity than hydrogel or "soft" lenses. RGP lenses often required wetting additives or surface coatings to provide adequate wettability.

More recently, the distinction between RGP contact lenses and hydrogel contact lenses has become blurred. For example, hydrophilic monomers have been copolymerized with certain siloxane monomers, such as 3-methacryloxypropyltris (trimethyl siloxy) silane (hereinafter TRIS), and dimers to produce contact lenses. For example, see U.S. Pat. Nos. 4,711,943 and 4,182,822 which discuss such copolymers.

New polymeric materials are continually being developed for biomedical devices which exhibit the strength and durability normally found with silicone-containing polymers yet provide the flexibility and water content often found with hydrophilic polymers. In the case of contact lenses, it is desirable to combine the beneficial properties of such polymers to obtain a copolymer having the best possible physical properties for overall lens performance and comfort. Thus, it continues to be desirable to obtain a contact lens having enough resilience in the hydrated state to maintain adequate lens shape. At the same time, the lens should not be so rigid as to cause any physiological problems such as corneal staining or flattening of the cornea, or other discomfort. On the other hand, the lens should not be too soft, or it will be difficult to handle and will tear easily during normal use. Further, if the lens is too soft, it will often result in poor optics.

It should also be noted that many additional factors can affect the performance of the copolymer materials. For example, the type and concentration of crosslinkers employed, which generally tie together long polymer chains, can significantly vary the properties of the materials. Further, various modifying agents can be employed to achieve desired physical viscoelastic and/or physiological properties such as strength, modulus, and various surface properties.

As described above, the use of TRIS monomers in RGP lenses is well known. TRIS is typically used as a strengthening agent or a modulus modifier and aids to increase oxygen permeability. Generally, TRIS lowers the modulus of the final copolymer. However, the present macromonomer can be advantageously employed to increase the silicone content of the copolymer and thereby increase the oxygen permeability without affecting the modulus of the copolymer to the extent experienced with TRIS. In fact, the present siloxane macromonomer can be employed in hydrogel copolymers in amounts of up to about 90 percent by weight of the final copolymer and still exhibit typical hydrogel characteristics.

The present invention is directed to novel siloxane macromonomers which can be copolymerized with hydrophilic monomers to prepare novel polymeric materials useful as biomedical devices and particularly useful as contact lens materials. Further, these macromonomers can be randomly copolymerized to produce elastomers having high oxygen permeability. Even further, these macromonomers can be randomly copolymerized with other classes of monomers, including those typically used as crosslinking agents and strengthening agents, to prepare polymeric materials which are strong, durable, and have high oxygen permeability.

SUMMARY OF THE INVENTION

The present invention provides for novel siloxane macromonomers comprising the reaction product represented by the following structural formula:

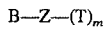

wherein B is a polymerizable end group containing at least one ethylenelically unsaturated group; E is derived from a functional chain transfer agent; T has the following structural formula:

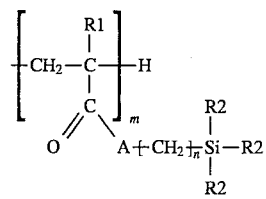

wherein n is an integer from I to 6, A is O

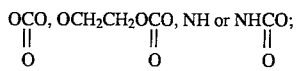

$R^1$ is H or $CH_3$; and each $R^2$ is independently selected from a $C_1$–$C_8$ alkyl group, a phenyl group, and a group of the following structural formula:

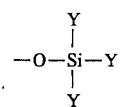

wherein each Y is independently selected, from a $C_1$–$C_8$ alkyl group, a phenyl group and a $((R^1)_3OSi—)$ group wherein each $R^1$ is independently a lower alkyl group; and m is an integer from 1 to 120, preferably, from 2 to 25.

Also provided by the present invention are copolymers prepared using the siloxane macromonomer of formula I and intermediate polymers used to prepare the siloxane macromonomer. The copolymers are useful in biomedical devices such as intraocular lenses, heart valves and other prostheses.

DETAILED DESCRIPTION OF THE INVENTION

The siloxane macromonomer of the present invention is suitable as a component of biomedical devices and, particularly, in contact lenses since they provide good oxygen permeability, stability, and durability.

Macromonomer

The present invention provides for the novel siloxane macromonomers represented by the structural formula I as shown above. In the preferred embodiments of the present invention, the siloxane moiety shown in structural formula II is selected from the following structural formula:

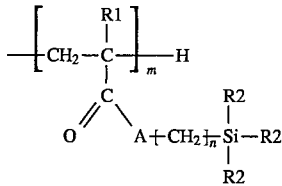

wherein A is O or NH, $R^1$ is H or $CH_3$, and each $R^2$ is independently selected from a $C_2$ to $C_4$ alkyl group and a $((CH_3)_3OSi)$ group and n is an integer from 2 to 4.

The present macromonomers are prepared by the polymerization of the parent siloxane monomer (precursor of formula II) in the presence of a functional chain transfer agent (precursor of E) to obtain an intermediate polymer. Illustrative examples of suitable parent siloxane monomers include TRIS, N-(tris(trimethyl siloxy)silylpropyl) methacrylamide (TSMAA), N-(tris(trimethylsiloxy)silylpropyl) acrylamide(TSAA) N-(tris(trimethylsiloxy)silylpropyl) methacryloxyethylcarbonate (TSMC), N-(tris(dimethylpropylsiloxy)silylpropyl)methacrylamide, N-(tris(dimethylphenylsiloxy)silylpropyl)methacrylamide, N-(tris(trimethylsiloxy)silylpropyl)methacryloxyglyceryl carbamate, N-(bis(dimethylethylsiloxy)silyl propyl) methacrylamide, N-(tris(trimethylsiloxy)silylpropyl) methacryloxyacetamide, N-(tris(trimethylsiloxy)silypropyl) methacryloxymethyl, dimethylacetamide, pentamethyldisiloxanymethyl methacrylate or acrylate, triphenyldemethyldisiloxanylmethyl methacrylate or acrylate , 3(tris(trimethylsilyloxy)silyl)propyl vinyl carbonate and carbamate (collectively TRISVC), and the like. Preferred parent siloxane monomers include TRIS, TSMAA, TSAA, TSMC and TRISVC.

The functional chain transfer agent controls the molecular weight and provides appropriate functionality for subsequent addition at the end of the intermediate polymer. Illustrative examples of suitable functional chain transfer agents include mercapto carboxylic acids, mercapto alcohols (also known as hydroxy mercaptans), and aminomercaptans with mercapto carboxylic acids and mercapto alcohols being preferred. Specific examples of suitable functional chain transfer agents include thioglycolic acid, 2-mercaptoethanol and 2-aminoethane thiol. The molar ratio of chain transfer agent to total parent siloxane monomer is from about 0.01 to about 0.5, preferably from about 0.05 to about 0.4 and most preferably from about 0.06 to about 0.3.

The intermediate polymer, the reaction product of the functional chain transfer agent with the parent siloxane monomer, is represented by the following stuctural formula:

$$E(T)_m \qquad \qquad V$$

wherein E is derived from a functional chain transfer agent; T has the following structural formula:

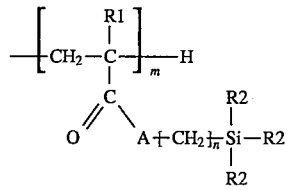

wherein n is an integer from 1 to 6, A is O,

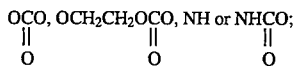

$R^1$ is H or $CH_3$; and each $R^2$ is independently selected from a $C_1$–$C_8$ alkyl group, a phenyl group, and a group of the following structural formula:

wherein each Y is independently selected from a $C_1$–$C_8$ alkyl group, a phenyl group, and a $((R)_3OSi—)$ group wherein R is independently a lower alkyl group; and m is an integer from I to 120, preferably from 2 to 25.

The intermediate polymer is then converted to the corresponding macromonomer of this invention containing a polymerizable end group functionality. Compounds useful to provide suitable end group functionality are selected from any compound having at least one reactive group and at least one ethylenically unsaturated group for further polymerization. The reactive group on the polymerizable compounds typically can be acid chlorides, epoxides, isocyanates and carboxylic acids which gives reaction products containing the following functional groups:

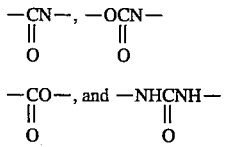

However, other reactive groups other than those specifically described above can be employed as are known to those skilled in the art. Illustrative examples of suitable compounds include, but are not limited to 2-isocyanatoethyl methacrylate and glycidyl (meth)acrylate.

The general reaction scheme for preparing the macromonomers of the present invention are generally known and are discussed in the article titled Synthesis of Methyl Methacrylate—Stearyl Methacrylate Graph Copolymers and Characterization By Inverse Gas Chromatography, K. Ito, et al, *Macromolecules* 1980, 216–221 which is incorporated herein by reference.

In a preferred embodiment, the siloxane monomer 3-methacryloyloxypropyltris (trimethy siloxy) silane (TRIS)

is polymerized in the presence of thioglycolic acid or mercapto ethanol as the functional chain transfer agent. TRIS, the functional chain transfer agent, and a suitable polymerization initiator such as azoisobutyronitrile are mixed. The mixture is deoxygenated, such as by vacuum or under an inert gas, and then heated and maintained at elevated temperatures, typically from about 40° C. to about 70° C. for about 10 to about 100 hours under an inert gas blanket. The intermediate polymer is mixed with a suitable compound having at least one ethylenically unsaturated group such as 2-isocyanatoethyl methacrylate. The mixture is refluxed under an inert gas until the reaction is complete. The solvent is removed by evaporation, vacuum or both and the resulting macromonomers are collected and purified such as by washing, as desired.

The macromonomers of the present invention may be copolymerized with various monomers to give suitable biomedical materials. Biomedical materials generally have physiochemical properties which render them suitable for prolonged contact with living tissues, blood, and membranes without adverse reaction. In the case of contact lens materials, the present macromonomers can be copolymerized with either hydrophilic monomers or hydrophobic monomers.

Hydrogels

As discussed above, the present siloxane macromonomers can be copolymerized with one or more hydrophilic monomers to prepare biomedical devices such as hydrogel contact lenses. As used herein, hydrogel refers to a hydrated crosslinked polymeric system that contains water at an equilibrium state. The macromonomer containing hydrogels are prepared by randomly copolymerizing a mixture containing at least one siloxane macromonomer of the present invention and at least one hydrophilic monomer. Although the hydrophilic monomer can function as a crosslinking agent (being defined as a monomer having multiple polymerizable functionalities), a separate crosslinker is preferably employed. Further, strengthening agents can be employed to give the desired physical properties such as 4-t-butyl-2-hydroxycyclohexyl methacrylate (TBCM), cyclohexyl methacrylate, TRIS, isobornyl (meth)acrylate and the like. Further, dyes, UV blockers, blue blockers and the like can be incorporated into the copolymer.

Preferred hydrophilic monomers may be either vinyl- or acrylic-containing. The term "vinyl-containing" monomers refers to monomers containing the vinyl grouping ($CH_2=CH-$), and are generally highly reactive. Such hydrophilic vinyl-containing monomers are known to polymerize relatively easily. Preferred hydrophilic vinyl-containing monomers which may be incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, with NVP being the most preferred.

"Acrylic-type" or "acrylic-containing" monomers are those monomers containing an acrylic group which are also known to polymerize readily. Preferred hydrophilic acrylic-containing monomers which may be incorporated into the hydrogel of the present invention include hydrophilic monomers such as N,N-dimethyl acrylamide (DMA), 2-hydroxyethyl methacrylate, glycerol methacrylate, 2-hydroxyethyl methacrylamide, methacrylic acid and acrylic acid, with DMA being most preferred.

When both an acrylic-containing monomer and a vinyl-containing monomer are incorporated into the polymer network, a further crosslinking agent having both a vinyl and an acrylic polymerizable group may be used, such as allyl methacrylates and the crosslinkers which are the subject of presently co-pending and commonly assigned U.S. patent application Ser. No. 07/922,452 filed Jul. 30, 1992, the entire content of which is incorporated herein by reference. Such crosslinkers help to render the resulting copolymer totally UV-curable. However, the copolymer could also be cured solely by heating, or with a combined UV and heat regimen. As known to the skilled artisan, suitable photo and/or thermal initiators are required to cure the copolymer and shall be included in the monomer mix.

Suitable crosslinking agents which may be incorporated into the siloxane macromonomer-containing copolymer of the present invention include polyvinyl, typically di- or trivinyl monomers, most commonly the di- or tri(meth)acrylates of dihydric ethylene glycol, triethylene glycol, butylene glycol, hexane-1,6-diol, thio-diethylene glycol-diacrylate and methacrylate; neopentyl glycol diacrylate; trimethylolpropane triacrylate and the like; N,N'-dihydroxyethylene-bisacrylamide and -bismethacrylamides; diallyl compounds like diallyl phthalate and triallyl cyanurate; divinylbenzene; ethylene glycol divinyl ether; and (meth)acrylate esters of polyols such as triethanolamine, glycerol, pentaerythritol, butylene glycol, mannitol, and sorbitol. Further, illustrative examples include N,N-methylene-bis-(meth)acrylamide, sulfonated divinylbenzene, and divinylsulfone. Also useful are the reaction products of hydroxyalkyl (meth)acrylates with unsaturated isocyanates, for example the reaction product of 2-hydroxyethyl methacrylate with 2-isocyanatoethyl methacrylate (IEM) as disclosed in U.S. Pat. No. 4,954,587 and dimers of TRIS as disclosed in U.S. Pat. No. 4,711,943.

Additional crosslinking agents include polyether-bisurethane-dimethacrylates as described in U.S. Pat. No. 4,192,827, and those crosslinkers obtained by reaction of polyethylene glycol, polypropylene glycol and polytetramethylene glycol with 2-isocyanatoethyl methacrylate (IEM) or m-isopropenyl-, dimethylbenzyl isocyanates (m-TMI), and polysiloxane-bisurethane-dimethacrylates as described in U.S. Pat. Nos. 4,486,577 and 4,605,712. Illustrative examples of preferred crosslinking agents of this type include polyethylene glycol dimethacrylate (PEGDMA) and polypropylene glycol dimethacrylate (PPGDMA). Still other known crosslinking agents are the reaction products of polyvinyl alcohol, ethoxylated polyvinyl alcohol or of polyvinyl alcohol-co-ethylene with 0.1 to 10 mol percent vinyl isocyanates like IEM or m-TMI.

As apparent to those skilled in the art, many monomers can function as crosslinking agents or can be used as monomers in the copolymerization. For example, one preferred class of silicone-containing monomers which can function as either crosslinking agents or as comonomers as described below is a poly(organosiloxane) polymer as described in U.S. Pat. No. 4,153,641.

These siloxane monomers preferably have between 2 and 500 repeating (($CH_3)_2-SiO-$) groups between two

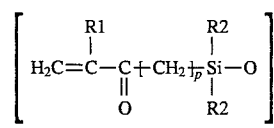  VI groups wherein $R^1$ is H or $CH_3$, preferably $CH_3$, $R^2$ is phenyl or a $C_1-C_6$ alkyl group, preferably $CH_3$, and p is an integer from between 2 and 8, preferably 4. Illustrative Examples of such preferred silicone monomers include compounds having the following structural formula:

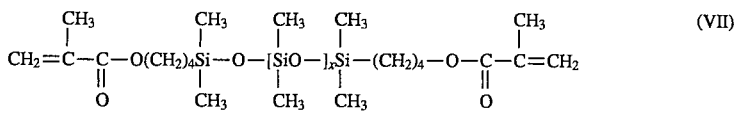

(VII)

wherein x is an integer from between 15 and 300. As referred to herein, these compounds are known as $M_2D_x$ wherein M represents the structural formula VI shown above, D represents the $-(CM_3)_2 SiO-$ group and x is an integer representing the number of repeating units of D.

The most preferred crosslinking agent for the hydrogel materials are selected from PEGDMA, PPGDMA, polyorganosiloxane monomers and dimers of TRIS.

Varying the ratio of hydrophilic monomer to siloxane macromonomer will change the properties of the final polymeric material. Accordingly, the selection of a particular ratio will be governed by the particular properties ultimately sought from the polymeric material. Typically, the siloxane macromonomer is present in the hydrogel copolymers in amounts from about 1 to about 90 weight percent, preferably will range from about 10 to about 80 weight percent, and most preferably from about 20 to about 70 weight percent. Further, the crosslinking agent may be optionally present in amounts up to about 80 percent, preferably up to about 60 percent by weight of the final copolymer.

The random hydrogel copolymers of the present invention are prepared by known polymerization processes such as by free radical mechanisms using a wide variety of known free radical polymerization catalysts or initiators such as diacyl peroxides, such as benzoyl peroxide; dialkyl peroxides, such as di-tert-butyl peroxides; ketone peroxides; methylspethyl ketone peroxides; and peresters which readily hydrolyze such as tert-butyl peracetate, tert-butyl perbenzoate, di-tertbutyl diperphthalate. A particular useful class of peroxy initiators are the organic hydroperoxides such as cumene hydroperoxide, methyl ethyl ketone hydroperoxide, tert-butyl hydroperoxide, and the like. The initiator should be used as a concentration from about 0.01 to about 10 percent by weight of the total formulation, preferably about 0.1 to about 5 percent by weight. Yet another class of initiators include carbonyl-containing ultraviolet-activated free radical generators, such as acetophenone, benzophenone, and benzoin ethers. Other suitable UV initiators and initiator mixtures will be apparent to the skilled artisan.

Copolymerization of hydrogel materials is generally performed in the presence of a solvent. Solvent choices will depend on the solubility perimeters of the macromonomers and monomers used and should be chosen to allow full solubilization of all components. Preferred solvents include, but are not limited to, tetrahydrofuran, dioxane, chloroform, dichloromethane, aliphatic alcohols, and mixtures thereof. The solvent, if nonaqueous, should be removed and replaced with water through the use of extraction and hydration procedures well known in the art.

Elastomers

As mentioned above, the present siloxane macromonomers can be copolymerized with the monomers described above as crosslinkers and strengthening agents or other hydrophobic monomers to prepare novel elastomers. As used herein, the term elastomers refers to copolymers which do not contain hydrophillic monomers. Examples of preferred hydrophobic monomers which can be copolymerized with the present siloxane macromonomer include the silicone-containing monomers as described above, polyethylene glycol di(meth)acrylate and polypropylene glycol di(meth)acrylate. Most preferred are the poly(organosiloxane) described above by formula VI which can be used to prepare novel elastomers useful in the preparation of biomedical devices.

These elastomers are prepared by the general copolymerization processes discussed above for the hydrogel copolymers except that the hydrophilic monomers are replaced with the hydrophobic or other monomers and the use of solvents may not be necessary. Such copolymerization can be conducted by those skilled in the art without undue experimentation. Generally, the siloxane macromonomer is present in the elastomer in amounts from about 1 to about 90, preferably from about 10 to about 80 and most preferably from about 20 to about 70 weight percent. Moreover, crosslinking agents can be employed in amounts of up to 80 percent, preferably up to 70 percent, by weight of the final copolymer.

The hydrogel or elastomer copolymers of this invention can be casted into films or biomedical devices by spine casting processes, cast molding processes, and other-known processes. Once formed, the devices can be further processed, as needed, using known techniques.

The present invention is illustrated by the following examples.

Example A

Preparation Of Intermediate Polymers

TRIS (100 g, 0.24 moles), thioglycolic acid (6.64 g, 0.072 moles) and azoisobutyronitrile (0.40 g, 2.4 m mole) were combined in a 250 mL round bottom flask. The mixture was deoxygenated by nitrogen bubbling for about 10 minutes. The mixture was then heated to 60° C. for 16 hours under a nitrogen blanket. The polymer was then dissolved in diethyl ether and washed three times in deionized water. The organic layer was then dried over magnesium sulfate. The magnesium sulfate was removed by filtration and the resulting polymer was isolated by flash evaporation of the solvent. The number average molecular weight of the resulting polymer was 1471 by size exclusion chromatography (sec) (vs. polystyrene standards) and the polydispersity, $M_w/M_n$, was 1.4. The number average molecular weight as determined by end group titration was 1218. These polymers were used to prepare the macromonomer below.

Preparation of Siloxane Macromonomer

The functionalized intermediate polymer of above (47.2 g, 0.039 moles), glycidyl methacrylate (5.82 g, 0.041 moles), butylated hydroxy toluene (0.005 g) and one drop of N,N-dimethyldodecylamine were combined in 200 mL of anhydrous toluene. The solution was allowed to reflux under a nitrogen blanket for 5 hours. Toluene was then removed by flash evaporation. The sample was then placed under high vacuum (0.25 mm Hg) for 24 hours. The macromonomer had a number average molecular weight of 2500 (vs. polystyrene standards) and a polydispersity of 2.3.

Example B

Preparation of Intermediate Polymers

TRIS (100g, 0.24 moles), 2-mercaptoethanol (5.63g, 0.072 moles) and azoisobutyronitrile (0.40g, 2.4m mole) were combined in a 250mL round bottom flask. The mixture was deoxygenated by nitrogen bubbling for about 10 minutes. The mixture was then heated to 60° C. for 72 hours under a nitrogen blanket. Completion of the reaction was verified by the disappearance of the C≡C stretch using fourier transform infrared techniques. The polymer was then dissolved in diethyl ether and washed three times with deionized water. The organic layers were combined and dried over magnesium sulfate. The magnesium sulfate was removed by filtration and the polymer was isolated after flash evaporation of the solvent. The number average molecular weight, ($M_n$), of the resulting polymer was 2543 by size exclusion chromatography (sec) (vs. polystyrene standards) and the polydispersity, $M_w/M_n$, was 1.25.

Preparation of Siloxane Macromer

The functionalized intermediate polymer of above (75.0 g, 0.029 moles), isocyanatoethyl methacrylate(IEM) (4.68g, 0.030 moles), dibutyl dilaurate (2.4 g, 3.8 m moles) and butylated hydroxy toluene (BHT) (0.02 g) were combined in 100 mL of absolute chloroform. The solution was allowed to reflux under a nitrogen blanket for 5 hours. Several mLs of methanol were then added to destroy any traces of unreacted isocacyanate. The reaction mixture was washed three times with deionized water and the chloroform layer was then dried over magnesium sulfate. The magnesium sulfate was removed by filtration and the macromonomer was isolated after flash evaporation of the solvent. The number average molecular weight ($M_n$), weight average molecular weight ($M_w$), and polydispersity ($M_w/M_n$) of the macromonomer were determined by sec vs. polystyrene standards, ($M_n$=2257, $M_w$=3109 and $M_w/M_n$=1.38).

Examples 1–10

Examples 1–10 were prepared using the macromonomer described in Example A except mercapto ethanol was used in place of the thioglycolic acid as the functional chain transfer agent.

Examples 11–13

Examples 11–13 were prepared using the macromonomer of Example B except Darocur® 1173 (0.2 parts) commercially available from E. M. Industries from Hawthorne, N.Y., was used as the catalyst.

Preparation of Films

Films were prepared by casting monomer formulations from the Examples above between (silane treated) glass plates. Curing was accomplished by exposure to ultraviolet light (3000–3500 $\mu W/cm^2$).

The copolymer films of examples 1–10 are hydrogel copolymers of the inventive macromonomer and N,N-dimethylacrylamide (DMA). The catalyst used to make the films in Examples 1–10 was benzoin methyl ether (BME). Hexanol was the solvent at 40 parts. Crosslinking agents used to form gel networks included polyethyleneglycol dimethacrylate (average chain molecular weight of 1000 shown as 1K), polypropyleneglycol dimethacrylate (average chain molecular weight of 4000 shown as 4K), and (,"-bis(4-methacryloxybutyl) polydimethylsiloxanes; $M_2D_{50}$, $M_2D_{100}$ and $M_2D_{300}$.

The copolymer films of Examples 11–13 are elastomers of the inventive macromonomer and various hydrophobic monomers. The catalyst used to make the films in Examples 11–13 was Darocur® 1173 (0.2 parts). The films were cast neat (no solvent).

Each of the films prepared from Examples 1–13 were tested for their physical properties using standard techniques.

Table I illustrates the copolymer formulations and Table II lists the film properties of the copolymers.

TABLE I

COPOLYMER FORMULATION
Parts (mole %)

| Examples | % Macro-monomer | Tris | DMA | Crosslinker$_1$ | Crosslinker$_2$ |
|---|---|---|---|---|---|
| 1 | 70.0 | — | 24.4 | PEGDMA 1K 5.47 (2.0) | — |
| 2 | 70.5 | — | 15.1 | PPGDMA 4K 14.4 (2.0) | — |
| 3 | 50.5 | 20.0 | 6.24 | PPGDMA 4K 23.26 (2.0) | — |
| 4 | 46.74 | — | 28.37 | $M_2d_{50}$ 24.89 (2.0) | — |
| 5 | 37.96 | — | 22.5 | $M_2d_{100}$ 39.54 (2.0) | — |
| 6 | 50.5 | — | 26.37 | $M_2d_{100}$ 23.13 (1.0) | — |
| 7 | 30.5 | 20.0 | 17.73 | $M_2d_{100}$ 31.77 (1.0) | — |
| 8* | 65.0 | 2.0 | 16.04 | PEGDMA 4K 16.96 | — |
| 9* | 70.0 | 5.0 | 19.48 | PEGDMA 4K 5.52 | — |
| 10* | 65.0 | 2.0 | 16.02 | PEGDMA 4K 8.48 | $M_2d_{50}$ 8.48 |
| 11** | 50.5 | 26.2 | — | $M_2d_{50}$ 23.3 | — |
| 12** | 30.5 | 26.2 | — | $M_2d_{50}$ 23.3 | $M_2d_{300}$ 20.0 |
| 13** | 20.5 | 26.2 | — | $M_2d_{50}$ 23.3 | $M_2d_{300}$ 30.0 |

*TRIS was replaced with TBCM
**The crosslinkers in Examples 11–13 are used as comonomers.

TABLE II

PROPERTIES OF COPOLYMER FILMS

| Example | Modulus (gm/mm²) | Tensile (gm/mm²) | Tear Strength (gm/mm) | % H$_2$O | Dk* |
|---|---|---|---|---|---|
| 1 | 311 | 52 | 5.0 | 25 | 70 |
| 2 | 191 | 41 | 6.3 | 17 | 90 |
| 3 | 68 | 50 | 9.5 | 6 | 125 |
| 4 | 298 | 73 | 4.0 | 24 | 102 |
| 5 | 104 | 33 | 5.3 | 28 | 143 |
| 6 | 224 | 63 | 5.4 | 27 | 91 |
| 7 | 133 | 56 | 12.0 | 12 | 187 |
| 8 | 135 | 38 | 6.3 | 15 | 71 |
| 9 | 147 | 50 | 8.6 | 20 | 62 |
| 10 | 179 | 47 | 6.7 | 11 | 85 |
| 11 | 74 | 28 | 3.3 | 0 | 238 |
| 12 | 75 | 36 | 2.2 | 0 | 323 |
| 13 | 81 | 33 | 2.0 | 0 | 353 |

*Dk units are $\times 10^{11} \frac{CM^3O^2 (STP) \times Cm}{Sec \times CM^2 \times mmHg}$ It should be understood that the scope of the present invention is not limited to the examples set forth above and includes equivalent embodiments, modifications and variations that fall within the scope of the attached claims.

What is claimed is:

1. A contact lens comprised of a copolymer which is the reaction product of the polymerization of a hydrophilic monomer, a crosslinking agent and an oil-soluble, non-surface active siloxane macromonomer of the structural formula:

$$B-E-(T)_m$$

wherein each B is a polymerizable end group containing at least one ethylenically unsaturated end group; E is a chain transfer agent;

T has the following structural formula:

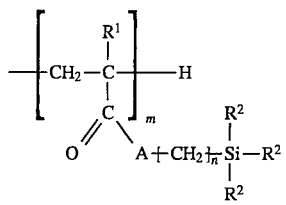

wherein n is an integer from 1 to 6, A is O,

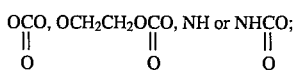

$R^1$ is H or $CH_3$; and each $R^2$ is independently selected from a $C_1$–$C_8$ alkyl group, a phenyl group and a group of the following structural formula:

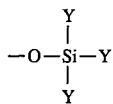

wherein each Y is independently selected from a $C_1$–$C_8$ alkyl group, a phenyl group and a $_{(R)3}OSi$— group wherein each R is independently a lower alkyl group; and m is an integer from 1 to 120.

2. The contact lens of claim 1 wherein m is an integer from 2 to 25.

3. The contact lens of claim 2 wherein A is O, $R^1$ is H or $CH_3$, and each $R^2$ is independently selected from a (($CH_3$)$_3$OSi—) group and n is an integer from 2 to 4.

4. The contact lens of claim 2 wherein A is H, $R^1$ is H or $CH_3$, and each $R^2$ is independently selected from a $C_1$–$C_8$ alkyl group, a phenyl group and a group of the following structural formula:

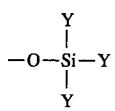

wherein each Y is independently selected from a $C_1$–$C_8$ alkyl group, a phenyl group and a $_{(R)}OSi$— group wherein each R is independently a lower alkyl group; and m is an integer from 1 to 120.

5. The contact lens of claim 3 wherein E is derived from a compound selected from mercapto carboxylic acids, mercapto alcohols and aminomercaptans.

6. The contact lens of claim 5 wherein the siloxane macromonomer is present in amounts from about 1 to about 90 weight percent of the final copolymer and the crosslinking agent is present in amounts of up to 80 percent by weight of the final copolymer.

7. The contact lens of claim 6 wherein the siloxane macromonomer is present in amounts from about 10 to about 80 weight percent of the final copolymer.

8. The contact lens of claim 7 wherein the hydrophilic monomer is a acrylic containing monomer.

9. The contact lens of claim 8 wherein the hydrophilic monomer is selected from N,N-dimethyl acrylamide, 2-hydroxyethyl methacrylate, glycerol methacrylate, 2-hydroxyethyl methacrylamide, methacrylic acid and acrylic acid.

10. The contact lens of claim 7 wherein the hydrophilic monomer is a vinyl-containing monomer.

11. The contact lens of claim 10 wherein the hydrophilic monomer is selected from N-vinyl lactams, N-vinyl-N-methyl acetamide, N-vinyl-N- ethyl acetamide, N-vinyl-N-ethyl formamide, and N-vinyl formamide.

12. The contact lens of claim 7 wherein the siloxane macromonomer comprises the reaction product of: an intermediate polymer formed by polymerizing 3-methacryloyloxypropyl tris(trimethyl siloxy) silane in the presence of thioglycolic acid; and glycidyl methacrylate.

13. The contact lens of claim 7 wherein the siloxane macromonomer comprises the reaction product of: an intermediate polymer formed by polymerizing 3-methacryloyloxypropyl tris(trimethyl siloxy) silane in the presence of 2-mercaptoethanol; and 2-isocyanatoethyl methacrylate.

* * * * *